US008245574B2

(12) United States Patent
Dossenbach et al.

(10) Patent No.: US 8,245,574 B2
(45) Date of Patent: Aug. 21, 2012

(54) DEVICE AND METHOD FOR ARRANGING A HOUSING IN A SPECIFIED POSITION RELATIVE TO A REFERENCE OBJECT

(75) Inventors: Daniel Dossenbach, Thayngen (CH); Thomas Roehm, Constance (DE); Martin Beerli, Frauenfeld (CH)

(73) Assignee: Baumer Innotec AG (CH)

( * ) Notice: Subject to any disclaimer, the term of this patent is extended or adjusted under 35 U.S.C. 154(b) by 393 days.

(21) Appl. No.: 12/624,588

(22) Filed: Nov. 24, 2009

(65) Prior Publication Data
US 2010/0132459 A1  Jun. 3, 2010

(30) Foreign Application Priority Data

Nov. 25, 2008 (CH) .................................... 1840/08

(51) Int. Cl.
*G01D 11/16* (2006.01)
(52) U.S. Cl. ........................................................ 73/431
(58) Field of Classification Search .................... 73/431
See application file for complete search history.

(56) References Cited

U.S. PATENT DOCUMENTS

| 5,608,277 | A  | * | 3/1997  | Emery et al. ............... 310/68 B |
| 6,496,263 | B1 | * | 12/2002 | Hall et al. ..................... 356/465 |
| 7,749,797 | B2 | * | 7/2010  | Bauer et al. ..................... 438/64 |
| 2002/0112759 | A1 | * | 8/2002  | Jaeger ........................... 137/237 |
| 2004/0083823 | A1 | * | 5/2004  | Tokumoto ................. 73/862.333 |
| 2004/0163821 | A1 | * | 8/2004  | vanBilderbeek ............... 166/379 |
| 2006/0021242 | A1 | * | 2/2006  | Boge et al. ....................... 33/706 |
| 2006/0150430 | A1 | * | 7/2006  | Boge et al. ....................... 33/300 |
| 2007/0073128 | A1 | * | 3/2007  | Hoarau et al. .................. 600/340 |
| 2010/0319470 | A1 | * | 12/2010 | Wehrle et al. ................. 73/866.1 |

* cited by examiner

*Primary Examiner* — David Rogers
(74) *Attorney, Agent, or Firm* — Kaplan Breyer Schwarz & Ottesen LLP

(57) ABSTRACT

A device and method for arranging a housing in a specified position relative to a reference object. For positioning and/or aligning a housing with respect to a reference object, a detachable positioning element is constructed on the housing. The positioning element comprises at least one stop element that is brought into contact with the reference object. The positioning element also comprises a carrier arm that connects the housing and the stop element, wherein the connection of the carrier arm to the housing is designed as a fracture point. After mounting the housing in the desired position, the positioning element is separated from the housing.

11 Claims, 3 Drawing Sheets

DEVICE AND METHOD FOR ARRANGING A HOUSING IN A SPECIFIED POSITION RELATIVE TO A REFERENCE OBJECT

FIELD OF THE INVENTION

The subject matter of the invention is a device and a method for arranging a housing in a specified position relative to a reference object.

BACKGROUND OF THE INVENTION

Sensors comprise one or more measured variable transducers arranged in a housing. Often sensors must be arranged, positioned, aligned, or mounted in a defined position relative to a machine part or an object to be detected. This applies especially to position, alignment, or angle sensors that have a short measurement or detection field and must be mounted at a small distance to the objects to be detected. Examples here are inductive or capacitive proximity switches or magnetic sensors in which a magnetoresistive sensor element is installed in the housing. Such sensors can monitor, e.g., the rotational angle or rotational speed of shafts. For this purpose, a magnet wheel or a magnetic carrier with a magnetic ring is connected coaxially and rotationally fixed to the shaft. The housing is mounted at a small radial distance of, e.g., 0.4 mm to the magnetic ring on a machine part that is rigidly connected to the bearing of the shaft to be detected. Conventional aids such as distance plates or templates are used for specifying the distance between the housing and the magnet wheel for the assembly of the sensor. The mounting of such sensors is rather complicated and time-intensive, because several loose parts must be held or handled simultaneously, namely the sensor itself, the template, mounting means, such as, e.g., screws, and possibly a mounting tool, such as, e.g., a screwdriver. Under these conditions, the accuracy of the positioning can also suffer. The distance plates required for mounting such sensors are often supplied as accessories with the corresponding sensor. This can also affect the costs of such sensors, because more parts are to be managed. Aids for simple, precise, and economical positioning and/or alignment are advantageous not only for sensor housings, but also for other housings, such as, e.g., actuator housings. The term "actuator" comprises general transducer elements that transform an input variable into an output variable.

SUMMARY OF THE INVENTION

The problem of the present invention is to create a relatively economical and easy-to-operate device and a corresponding method for arranging a housing relative to an object.

This problem is solved by a device and a method for arranging a housing in a specified position relative to a reference object.

According to the invention, a positioning means that can be detached or removed reversibly from a positioning region is formed on the housing. According to one embodiment, this means is connected to the housing by means of thin connections constructed as desired fracture points. When the housing is to be mounted on a machine part, its desired position can be found by placing the positioning means on a reference object; the housing can then be fixed in this position.

Here, the positioning means need not be held manually, because it is held on the housing with sufficient stability. The housing is preferably a sensor housing or an actuator housing. The term "sensor" is used in the context of the present patent application for a sensor housing in which one or more sensor elements are arranged. An analogous situation applies to the term "actuator." The reference object could be, e.g., an object to be detected by the sensor, for example, a magnet wheel. The positioning means could be designed to suit the given requirements, e.g., for specifying or fixing a desired distance and/or for preventing an angular offset and/or a transversal offset or axial offset between the reference object and the sensor. It is used as a stop means for the sensor for its mounting. In the case of a magnet wheel to be detected, e.g., its lateral surface and/or its end surfaces could be used as stop surfaces for one or more elements or sections of the positioning means. In the case of alternative applications, in principle, any other machine part could also be used as a reference object for positioning and/or aligning the sensor.

The positioning means can comprise, e.g., a spacer or a distance plate with which the distance between the measurement object to be detected and the housing or one or more sensor elements arranged rigidly in the housing can be set to a desired value before the housing is fixed in this position. For certain applications, such a one-dimensional distance specification is sufficient. In the case of other applications, it may be necessary for the arrangement and/or alignment of the sensor that other geometric parameters, such as position, alignment, and/or angle coordinates be specified and that the correspondingly designed positioning means forms a contact at several points or on several contact faces of the reference object. Thus, for example, one or more cams injection-molded on the housing and/or other contact elements could be used for fixing positions, distances, or angles.

After the housing has been brought with the aid of the positioning means into the specified alignment and/or position, it is fixed on the corresponding system or machine part with suitable fastening means, for example, by means of screws or clamps. The positioning means can then be detached from the housing and removed. For this purpose, preferably a strap or a grip is constructed on the positioning means. Pulling this strap rips the connections between the positioning means and the housing. The pulling direction and the required forces for tearing through the desired fracture points are dimensioned so that the detachment and removal of the positioning means do not lead to a change in the position of the sensor relative to the reference object. Alternatively, the positioning element could also be constructed so that it could be separated or stripped from the housing through movements of the reference object—in the case of a magnet wheel, e.g., through its rotational movement. Thus, the positioning element can comprise, e.g., spacer cams injection-molded on the housing. These can include desired fracture points, if needed. For the attachment of the housing, the spacer cams are lightly pressed against the magnet wheel. As soon as the magnet wheel begins to turn, the spacer cams break away due to the acting friction and leverage forces.

In comparison with conventional sensors, the mounting of sensors with the device according to the invention is simpler and the necessary mounting time is shorter.

According to another embodiment of the invention, the positioning means can be reversibly removed from the positioning region. Advantageously, the positioning means or the positioning element could be held so that it is also fixed on the housing in a location away from the positioning region. One possibility is a rotating holder. If the housing is aligned and fixed with the aid of the positioning means relative to the reference object, then the positioning means can be moved through rotation from the positioning region into a second location in which the positioning means does not influence the measurement of the sensor or the operation of the actuator.

Another possibility consists of holding the positioning means so that it is displaceable along the housing. For this purpose, in one refinement of the invention, rails, preferably in the form of profiled rails, can be arranged on the housing, which hold the positioning means to be displaceable along the rails.

BRIEF DESCRIPTION OF THE DRAWINGS

With reference to a few figures, an example implementation of the invention will be described in more detail below. Shown are FIG. 1 a side view of a magnetic sensor with positioning means formed on its housing before alignment on a magnet wheel, FIG. 2 the magnetic sensor from FIG. 1 during the alignment on the magnet wheel, FIG. 3 the magnetic sensor from FIG. 1 after the alignment on the magnet wheel and after the detachment of the positioning means, FIG. 4 an embodiment of a positioning means with a contact face for the axial positioning of a magnetic sensor relative to a magnet wheel, FIG. 5 an embodiment with positioning means held so that it can rotate, and FIG. 6 an embodiment with positioning means held so that it can rotate.

DETAILED DESCRIPTION

Figure 3:
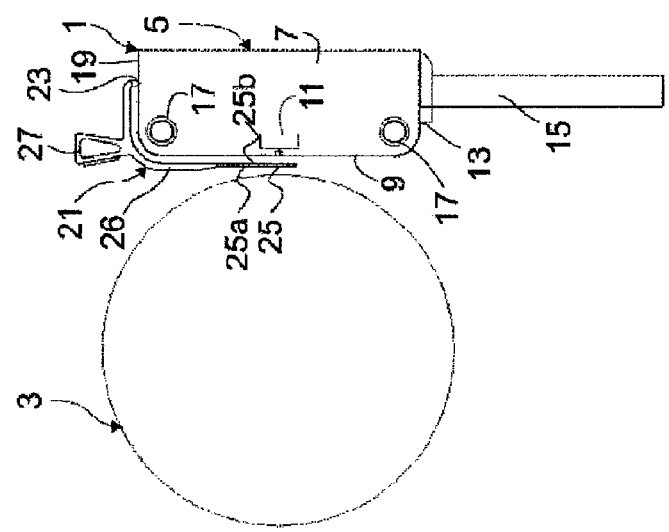
Figure 2:
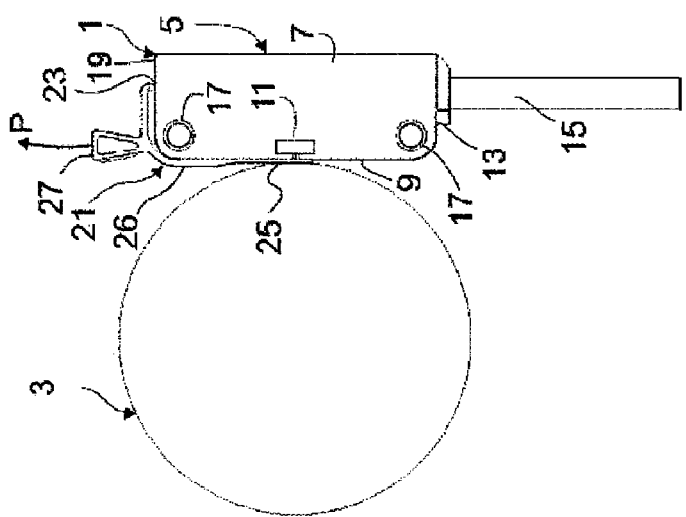
Figure 1:
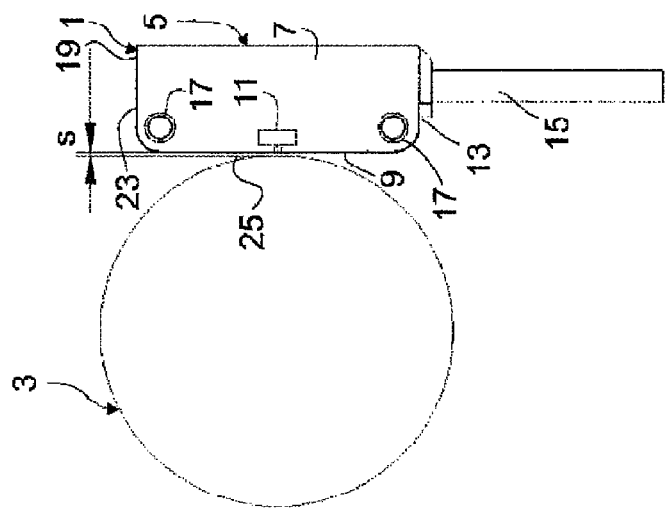

FIGS. 1-3 illustrate the alignment process of a magnetic sensor 1 on a magnet wheel 3 in a time sequence. The magnet wheel 3 is locked so that it rotates with a shaft that is supported on a machine part and whose pivot angle or rotational speed is to be detected (not shown). The magnetic sensor 1 comprises a housing 5 made from plastic and produced using injection-molding methods or a different method. In the interior of the housing 5, one or more magnetoresistive sensor elements 11 are arranged between two parallel side walls 7 (of which only the front wall is visible) and directly adjacent to or only a small distance from the front wall 9. They are connected to a (not-shown) controller. On the housing floor 13, a connection cable 15 is led out from the housing 5. Alternatively, e.g., a plug connection or another interface (e.g., radio, optical) could also be provided. For mounting on a contact part or machine part, two continuous boreholes or mounting holes 17 are formed between the two side walls. On the housing ceiling 19, positioning means 21 in the form of an L-shaped band is connected to the housing 5 along a narrow connection edge 23 constructed as a weak point or as a desired fracture point and aligned orthogonal to the two side walls 7. The connection edge 23 can extend across the entire width of the housing 5 or across only a portion of this width. It connects the end of the shorter leg of the positioning means 21 to the housing ceiling 19 continuously or discontinuously like perforations. The positioning means 21 is produced together with the housing 5 as a one-piece or integrally injection-molded part. The two legs of the positioning means 21 follow the outer contours of the housing 5 or the housing ceiling 19 and the front wall 9 at a small distance of, e.g., 1 mm. In addition to the connection edge 23, the positioning means 21 could also be connected to the housing 5 or to the housing ceiling 19 and/or the front wall 9 at other connection edges (not shown), so that the positioning means 21 is held with sufficient stability on the housing 5 before use and cannot be ripped away inadvertently.

The end region or a region of the longer leg of the positioning means 21 that is arranged in front of the sensor element or elements 11 is constructed as a spacer 25 or distance plate and has a defined thickness s that corresponds to the desired distance between the front wall 9 of the housing 5 and the magnet wheel 3. In the example shown, the thickness s is approximately 0.4 mm and thus smaller than the thickness of the part of the band-shaped positioning means 21 constructed as a carrier arm 26 and bordering the spacer 25. This thickness can be on the order of, e.g., approximately 1 mm. The thickness s of the spacer 25 is specified according to the corresponding requirements of the sensor and, in principle, can be any value. These values can lie, for example, in a range from 0.2 mm to 20 mm and thus also be greater than the thickness of the carrier arm 26. In the middle region of the positioning means 21, where the two legs merge, a strap or a small grip 27 is formed projecting toward the outside.

As shown in FIG. 2, for the mounting of the magnetic sensor 1 on a machine part that is rigidly connected to the bearing of the shaft carrying the magnet wheel 3, the distance between the front side 3 of the magnetic sensor 1 and the periphery or the lateral surface of the magnet wheel 3 can be set exactly to the desired magnitude s with the aid of the positioning means 21. Here, the magnetic sensor 1 is pressed lightly against the magnet wheel 3, wherein a first stop face 25b of the plate-shaped spacer 25 that is free or that is optionally connected only by narrow connection webs (not shown) to the housing 5 contacts the front wall 9 of the magnetic sensor 1, and wherein a second stop face 25a of the space 25 contacts the lateral surface of the magnet wheel 3. The spacer 25 is clamped here with a small force between the housing 5 and the magnet wheel 3 used as a reference object. In this position, the magnetic sensor 1 is fixed on the corresponding machine part. In the present example, this can be realized, e.g., by screwing the housing 5 tightly on the machine part by means of two screws inserted into the mounting holes 17. The positioning means 21 is then separated or torn away from the housing 5 by pulling the grip 27 in the direction of the arrow P (FIG. 2). Here, the spacer 25 between the magnetic sensor 1 and the magnet wheel 3 is also pulled out and removed, without which the relative position of the housing 5 and the reference object would change.

In the case of alternative implementations, instead of a simple spacer 25, more complex stop devices could be provided that allow the specification of the position and/or the alignment of the housing (5) relative to a reference object in not only one dimension, but also several dimensions. Thus, for example, the positioning means 21 could comprise one or more additional stop faces that are aligned differently in the three-dimensional space. In the present example of the magnetic sensor 1, for example, in addition to the spacer 25, another stop element could be provided that projects onto the second stop face 25b and that is used for the axial alignment on the magnet wheel 3, in that it is brought into contact with a side surface of the magnet wheel 3. The number, type, arrangement, shape, and alignment of stop elements can be specified in an arbitrary way according to the appropriate requirements for the positioning and/or alignment (e.g., inclination angle) of the sensor relative to a reference object.

As reference objects, not only the objects to be detected, but also any system or machine parts could be used, with reference to which the sensor must be positioned and/or aligned.

The housing (5) can have any shape and absolutely need not be produced entirely as a plastic injection-molded part.

Thus, for example, positioning means 21 could also be molded on also in the case of a housing or a housing part made from metal.

If a different positioning means (21) in connection with a specified housing (5) is required for certain applications, then it can be produced with different changing inserts for the injection-molded part. In the case of alternative implementations of the invention, the positioning means (21) could also be connected to the housing (5) by means of a detachable latch connection.

Figure 4:
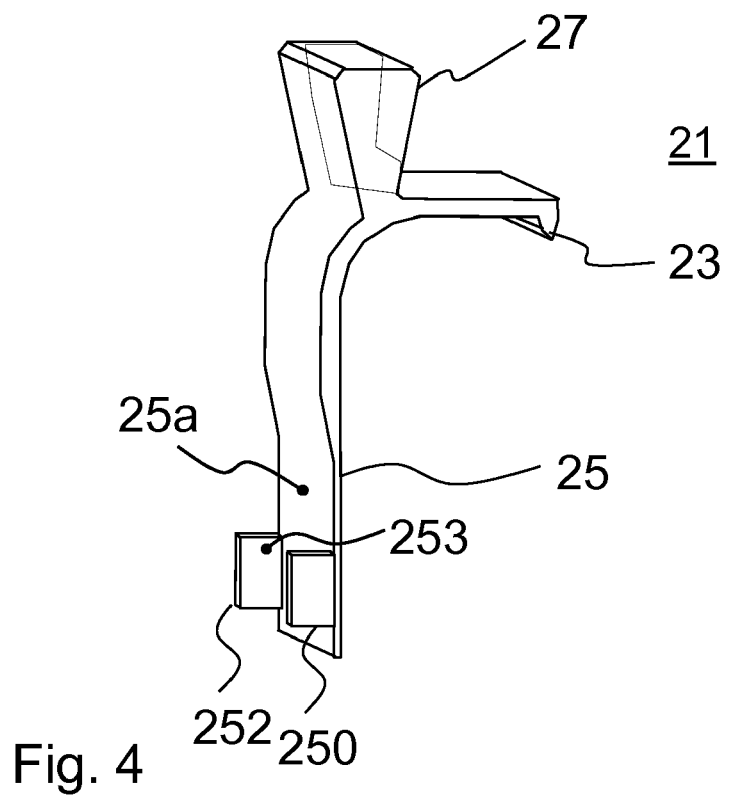

FIG. 4 shows an embodiment of positioning means 21 with a stop face for the axial positioning of a magnetic sensor relative to a magnet wheel as was described further above. The basic form of the positioning means 21 with the connection edge 23 and spacer 25 also corresponds to the embodiment shown in FIGS. 1-3. There are two plate-shaped recesses 250, 252 on the second stop face 25*a* of the spacer 25, wherein this stop face contacts the lateral surface of the magnet wheel when mounted. Their spacing is dimensioned so that the magnet wheel can be housed with its end faces between the insides 253 facing each other. The recesses 250, 252 here cause a fixing of the axial position on the end faces of the magnet wheel.

The idea forming the basis of the invention to construct, on a housing, positioning means that can be detached or that can be removed reversibly from the positioning region can advantageously be applied in the case of any sensor, particularly in the case of distance sensors or proximity switches that can function according to different physical principles. Examples here are magnetic, inductive, capacitive, optical, and ultrasound proximity switches or distance sensors. The field of application of the invention is not limited just to the housing (5) of sensors. Such positioning means can be constructed for any housing that must be positioned relative to an object, e.g., also for actuator housings.

Figure 5:
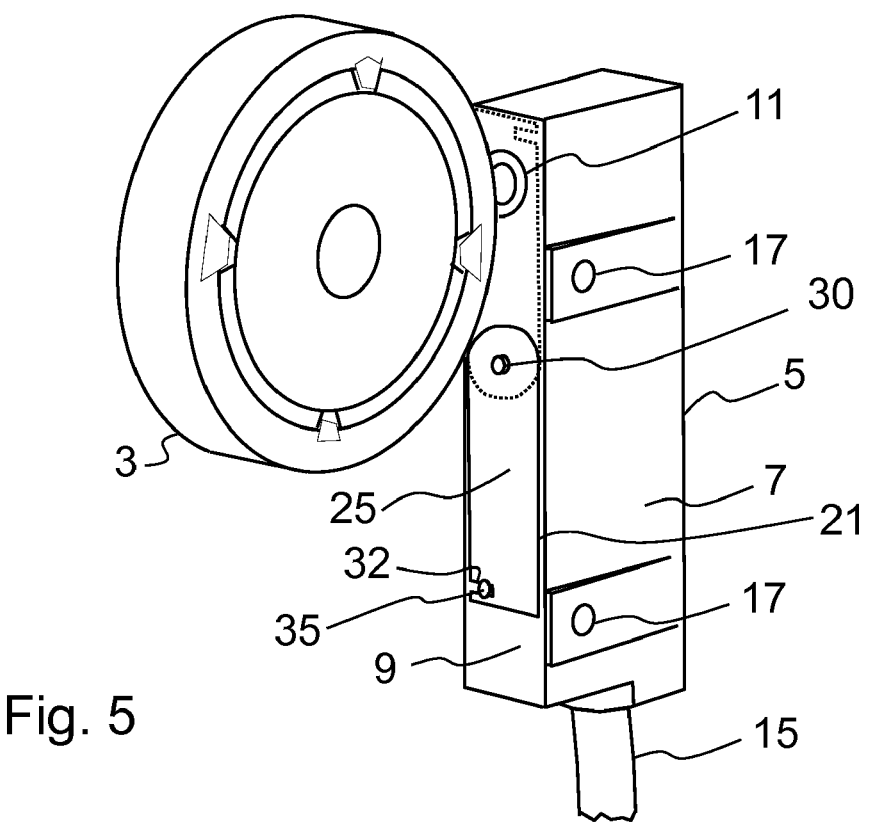
Figure 6:
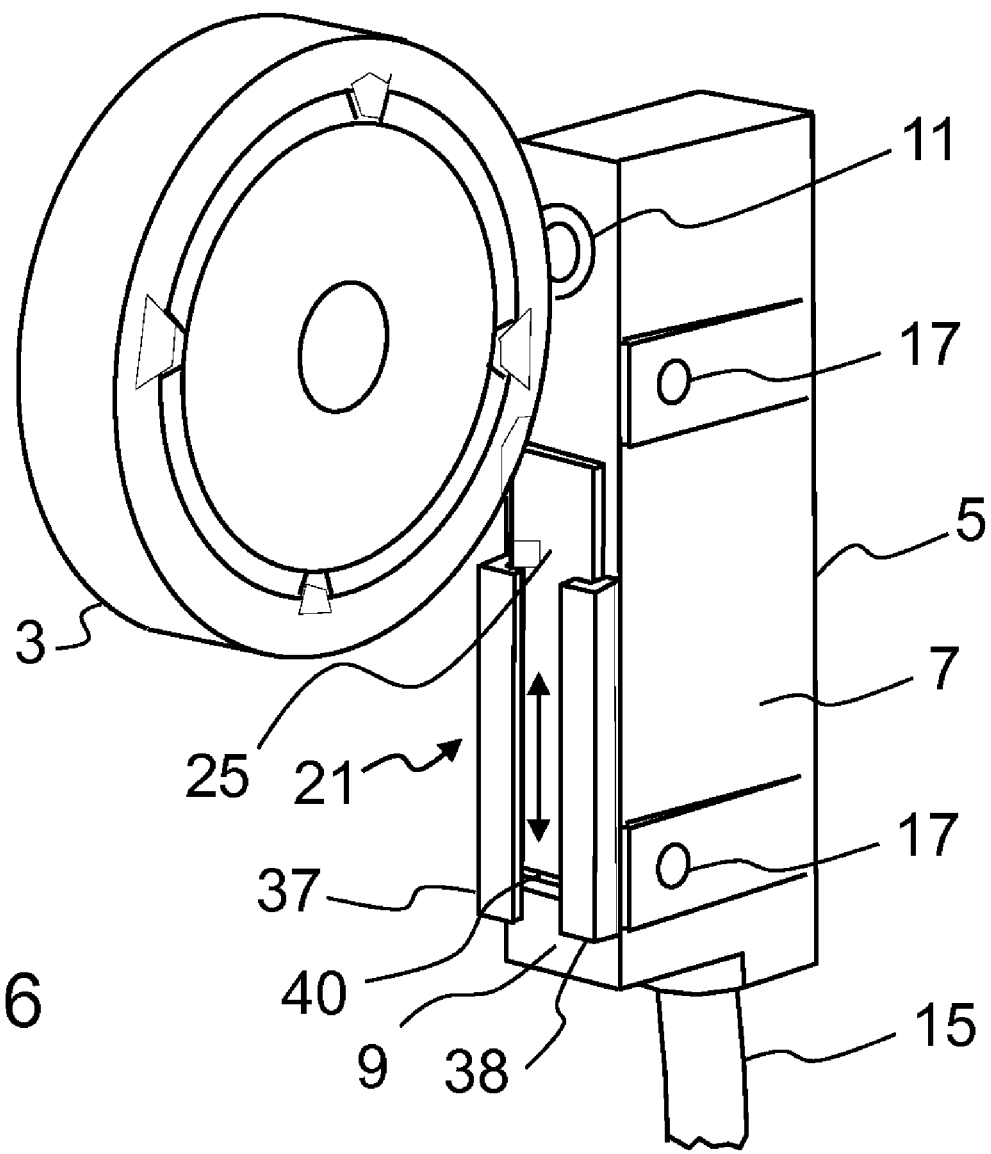

With reference to FIGS. 5 and 6, two embodiments with positioning means that can be removed reversibly from the positioning region will be described below. As also in the preceding examples, the positioning means comprises a spacer 25 or a distance plate, in order to be able to arrange the sensor or actuator at a defined distance to a reference object. Both examples will be explained again with reference to a magnetic sensor or rotary encoder.

The magnetic sensor shown in FIG. 5 here has positioning means 21 held so that it can rotate. The spacer 25, constructed as a distance plate, is fixed on a pivot axis 30 arranged on the front wall 9 so that it can pivot. The pivot or rotary axis of the spacer 25 thus lies parallel to the distance between the magnet wheel 3 and the front wall. This allows a lateral pivoting away of the positioning means after the calibration and fixing of the housing 5. The positioning region is located according to the distance to be set in front of the sensor element or elements 11, or between the front wall 9 and the reference object, here, in particular, the magnet wheel 3.

In FIG. 5, the positioning means 21 is shown in a location away from the positioning region, corresponding to the location for the operation of the sensor. For illustration, the positioning means 21 is again drawn using dashed lines in the positioning or calibration location in which the spacer 25 is located in front of the sensor element 11.

In order to prevent the positioning means 21 from unintentionally moving during operation of the sensor back into the calibration position (drawn with dashed lines), locking can be provided with which the positioning means 21 is locked in the operating position shown in FIG. 5, that is, the position provided for the operation of the sensor. For this purpose, in the example shown in FIG. 5, a groove 32 is provided in the spacer 25, wherein this groove can be engaged with a pin 35 on the housing 5.

FIG. 6 shows another embodiment with positioning means 21 that can be removed reversibly from the positioning region on the sensor element 11. In the case of this embodiment, the positioning means 21 is held so as to be displaceable along the housing 5. For this purpose, on the front side 9, two profiled rails 37, 38 are arranged in which the plate-shaped spacer 25 is held longitudinally displaceable along the front side 9. In the diagram of FIG. 6, the spacer 25 is likewise already in the operating position of the sensor. The spacer 25 is removed from the positioning region in front of the sensor element 11 accordingly through displacement. Also here, locking can also be provided that prevents the spacer 25 from falling back into the positioning region without intervention. For this purpose, in the example shown in FIG. 6, a groove 40 is provided that locks in a catch tab arranged, for example, in the profiled rail.

The features according to the invention can be summarized, in particular, as follows:

An actuator or sensor housing comprises a calibration device with the positioning device or the positioning means, wherein, in the housing, at least one sensor or actuator element is or can be arranged, and wherein the positioning device comprises a spacer fixed on the outside of the housing, wherein the spacer has a thickness fixing the operating distance of the sensor or actuator element to a reference object interacting with the sensor or actuator element, in particular, which corresponds to the operating distance between the outside of the housing and the reference object, and wherein the spacer is fixed on the housing to be detachable or moveable such that the spacer can be removed from the operating region of the sensor or actuator element after the sensor housing is fixed relative to the sensor or actuator element. Here, the removal can be performed as described through detachment or through a reversible movement of the spacer from the operating region of the sensor or actuator element.

In this way, a method for mounting a sensor or actuator is provided in which the housing with the spacer mounted thereon and the reference object are brought into contact, so that the distance between the housing outer wall and the reference object is specified and fixed by the spacer. Then the sensor or actuator housing is fixed and the spacer provided between the housing outer wall and the reference object is removed after the attachment of the sensor or actuator housing.

The invention claimed is:

1. A device for arranging a housing (5) in a specified position relative to a reference object, wherein, on the housing (5), a positioning means (21) is constructed that can be detached or removed reversibly from a positioning region and that can be brought into contact with the reference object, wherein the positioning means (21) comprises one or more stop elements for positioning and/or aligning on the reference object, and wherein the positioning means (21) comprises a carrier arm (26) connecting the housing (5) and the one or more stop elements and that the connection of the carrier arm (26) to the housing (5) is designed as a desired fracture point.

2. The device according to claim 1, wherein the housing (5) is a sensor or actuator housing.

3. The device according to claim 2, wherein the housing (5) is a sensor housing, and wherein one or more sensor elements (11) are arranged in or on the housing (5).

4. The device according to claim 1, wherein the one or more stop elements are sections of the positioning means (21) constructed as spacers (25) or distance plates and that these spacers (25) comprise a first stop face (25b) facing the housing (5) and a second stop face (25a) constructed for contacting the reference object.

5. The device according to claim 1, wherein a grip (27) for separating the positioning means (21) from the housing (5) is constructed on the carrier arm (26).

6. The device according to claim 1, wherein the housing (5) is produced as a plastic injection-molded housing and that the positioning means (21) is integrally formed on the injection-molded housing.

7. The device according to claim 1, wherein the positioning means is held so that it is also fixed on the housing (5) in a location away from the positioning region.

8. The device according to claim 7, wherein the positioning means (21) is held so that it can rotate.

9. The device according to claim 7, wherein the positioning means (21) is held so as to be displaceable along the housing (5).

10. A method for arranging a housing (5) in a specified position relative to a reference object by means of a device according to claim 2, characterized by bringing the sensor or actuator housing into the specified position and/or alignment through contact with the one or more stop elements on the reference object.

11. The method according to claim 10, wherein the housing (5) is fixed to a contact part or machine part and that afterwards the positioning means (21) is separated from the housing (5) or moved away from the positioning region.

* * * * *